United States Patent
Jo et al.

(10) Patent No.: US 8,865,018 B2
(45) Date of Patent: Oct. 21, 2014

(54) ANODE ACTIVE MATERIAL FOR A RECHARGEABLE LITHIUM BATTERY

(76) Inventors: Jae Won Jo, Incheon (KR); Seung-Taek Myung, Gwangju (KR)

(*) Notice: Subject to any disclaimer, the term of this patent is extended or adjusted under 35 U.S.C. 154(b) by 187 days.

(21) Appl. No.: 13/509,172

(22) PCT Filed: Nov. 4, 2010

(86) PCT No.: PCT/KR2010/007768
§ 371 (c)(1),
(2), (4) Date: May 10, 2012

(87) PCT Pub. No.: WO2011/059204
PCT Pub. Date: May 19, 2011

(65) Prior Publication Data
US 2012/0228562 A1    Sep. 13, 2012

(30) Foreign Application Priority Data

Nov. 11, 2009  (KR) .................. 10-2009-0108344
Jun. 11, 2010  (KR) .................. 10-2010-0055262

(51) Int. Cl.
*H01M 4/88* (2006.01)
*B60L 11/18* (2006.01)

(52) U.S. Cl.
CPC ............ *H01M 4/505* (2013.01); *Y02T 10/7005* (2013.01); *B60L 11/1879* (2013.01); *C01G 45/1242* (2013.01); *H01M 10/4235* (2013.01); *C01P 2002/52* (2013.01); *C01P 2002/72* (2013.01); *Y02T 10/705* (2013.01); *C01P 2006/40* (2013.01); *H01M 10/052* (2013.01); *C01G 51/54* (2013.01); *Y02T 10/7011* (2013.01); *Y02E 60/122* (2013.01); *Y10S 977/773* (2013.01)
USPC .............. 252/182.1; 252/519.15; 429/231.95; 977/773

(58) Field of Classification Search
CPC .......................... H01M 4/50; H01M 2004/027
USPC ...................... 252/182.1, 519.15; 429/231.95; 977/773
See application file for complete search history.

(56) References Cited

FOREIGN PATENT DOCUMENTS

| JP | 2008084743 A | 4/2008 |
|---|---|---|
| KR | 10-2000-0029333 A | 5/2000 |
| KR | 10-2008-0105637 A | 12/2008 |

OTHER PUBLICATIONS

Reimers, J.N., et al.,"Electrochemical and In Situ X-Ray Diffraction Studies of Lithium Intercalation in Lix CoO2", J. Electrochem. Soc., vol. 139, No. 8, pp. 2091-2097, (Aug. 1992).

(Continued)

*Primary Examiner* — Khanh Tuan Nguyen
(74) *Attorney, Agent, or Firm* — Nath, Goldberg & Meyer; Jerald L. Meyer

(57) ABSTRACT

An anode active-material for rechargeable lithium batteries and methods of manufacturing the same. This includes preparing an anode active-material for rechargeable lithium batteries, including heat-treating a mixture of $Li_2CO_3$, $MnO_2$, MgO, $Al_2O_3$ and $Co_3O_4$ at 900-1000° C. in air or oxygen for 10-48 hours, generating a lithium-containing oxide; generating metal-oxide nanoparticles MO (5-500 nm) (M represents Mg, Co or Ni, with a valence of 2); and dry or wet mixing 0.01-10 wt % of pulverized metal oxide nanoparticles with the lithium-containing oxide to form an anode active-material. Spinel type $MgAl_2O_4$ is substituted into a basic spinel-structure ($Li_{1.1}Mn_{1.9}O_4$) for structural stability. Spinel type $Co_3O_4$ is substituted to improve electronic conductivity, improving battery performance. Metal-oxide nanoparticles (5-500 nm) act as scavengers of HF generated by electrolyte decomposition, wherein the spinel type anode active-material may be used as an anode active-material of spinel type $LiMn_2O_4$ for rechargeable lithium ion batteries, realizing low-price, high-output, long-lifespan and high-capacity.

4 Claims, 7 Drawing Sheets

(51) Int. Cl.
*C01G 45/12* (2006.01)
*H01M 4/505* (2010.01)
*C01G 51/00* (2006.01)
*H01M 10/42* (2006.01)
*H01M 10/052* (2010.01)

(56) References Cited

OTHER PUBLICATIONS

Kostecki, R., et al., "Local-Probe Studies of Degradation of Composite LiNi0.8 Co0.015 Al0.5O2 Cathodes in High-Power Lithium-Ion Cells", Electrochemical and Solid-State Letters, 7, (10) pp. A380-A383, (2004).

Myung, Seung-Taek, et al., "Structural, Electrochemical, and Thermal Aspects of Li[Ni0.5MN0.5)1-X Cox]O2 ($0 \leq x \leq 0.2$) for High-Voltage Application of Lithium-Ion Secondary Batteries", Journal of the Electrochemical Society, 155 (5) pp. A374-A383, (2008).

Deng B. et al.,"Superior Capacity Retention of Oxygen Stoichiometric Spinel Li1+xMn2-xO4+σ at Elevated Temperature", Electrochemical and Solid-State Letters, 8 (3), pp. A171-A174, (2005).

Strobel, P., et al., "Characteristics of the 4 V plateau in LiMn2(O4-xFx) studied by in situ synchrotron X-ray diffraction", Journal of Power Sources, 81-82, pp. 458-462, (1999).

Banov, B, et al., "LiMn2-xCoxO4 cathode with enhanced cycleability", Journal of Power Sources, 68, pp. 578-581, (1997).

Wohlfahrt-Mehrens, M., et al. "The influence of doping on the operation of lithium manganese oxide spinel", Journal of Power Sources, 68, pp. 582-585, (1997).

Stoyanova, R., et al. "Effect of Mn-substitution for Co on the crystal structure and acid delithiation of LiMnyCo1-yO2 solid solutions", Solid State Ionics, 73, pp. 233-240, (1994).

Amine, K., et al. "A New Three-Volt Spinel Li1+xMn1.5 Ni0.5 O4 for Secondary Lithium Batteries", J. Electrochem. Soc. vol. 143, No. 5, pp. 1607-1613, (May 1996).

Hosoya, M. et al. "Single phase region of cation substituted spinel LiMyMn2-yO4-σ (M=Cr, Co and Ni) and cathode property of lithium secondary battery", Solid State Ionics, 111, pp. 153-159, (1998).

Amine, K. et al., "Preparation and electrochemical investigation of LiMn2-xMexO4 (Me:Ni, Fe, and x+0.5, 1) cathode materials of secondary lithium batteries", Journal of Power Sources, 68, pp. 604-608, (1997).

Sigala, C. et al., "The Cr-Substituted Spinel Mn Oxides LiCryMn2-yO4($0 \leq y \leq 1$): Rietveld Analysis of th Structure Modifications Induced by the Electrochemical Lithium Deintercalation", Journal of Solid State chemistry 132, pp. 372-381, (1997).

Hernán, L. et al., "Use of Li-M-Mn-O [M=Co, Cr, Ti] spinels prepared by a sol-gel method as cathodes in high-voltage lithium batteries", Solid State Ionics, 118, pp. 179-185, (1999).

Feng, Qi, et al.,"Li+ Extraction/Insertion Reactions with LiZn0.5Mn1.5)4 Spinel in the Aqueous Phase", Chem. Mater., 7, pp. 379-384, (1995).

Yair Ein-Eli, et al.,"LiMn2-xCuxO4 Spinel ($0.1 \leq x \leq 0.5$): A new class of 5 V Cathode Materials for Li Batteries", J. Electrochem. Soc., vol. 145, No. 4, pp. 1238-1244, (Apr. 1998).

Gui-Ming Song, et al., "Synthesis of Mg-doped LiMn2O4 powders for lithium-ion batteries by rotary heating", Material Chemistry and Physics, 87, pp. 162-167, (2004).

Hwang, B.J., et al.,"Effect of Al-substitution on the stability of LiMn2O4 spinel, synthesized by citric acid sol-gel method", Journal of Power Source, vol. 102. pp. 326-331, (2001).

Eftekhari, Ali, "Aluminum oxide as multi-function agent for improving battery performance of LiMn2O4 cathode", Solid State Ionics, vol. 167, pp. 237-242, (2004).

Kannan, A.M., et al., "Surface/Chemically Modified LiMn2O4 Cathodes for Lithium-Ion Batteries", Electrochemical and Solid-State Letter, 5 (7), pp. A167-A169, (2002).

Cho, J., et al. "Complete blocking of Mn3+ ion dissolution from a LiMn2O4 spinel intercalation compound by Co3O4 coating", Chem. Commun., pp. 1074-1075, (2000).

Hibino, M., et al.,"Improvement of cycle life of spinel type of lithium manganese oxide by addition of other spinel compounds during synthesis", Solid State Ionics, 177, pp. 2653-2656, (2006).

Robertson, A.D. et al., "Low temperature lithium manganese cobalt oxide spinels, Li4-xMn5-2xCo3xO12 ($0 \leq x \leq 1$), for use as cathode materials in rechargeable lithium batteries", Journal of Power Sources, 97-98, pp. 332-335, (2001).

Sung Bin Park, et al., "Improvement of capacity fading resistance of LiMn2O4 by amphoteric oxides", Journal of Power Sources, 180, pp. 597-601, (2008).

European Patent Application No. 10830137.5, Search Report dated May 27, 2014, eight (8) pages.

Hibino, M., et al., "Improvement of Cycle Life of Spinel Type of Lithium Manganese Oxide by Addition of other Spinel Compounds During Synthesis", Solid State Ionics, vol. 177, 2006, pp. 2653-2656.

Myung, S., et al., "Improvement of Cycling Performance of Li1.1Mn1.9O4 at 60 C by NiO addition for Li-Ion Secondary Batteries", Electrochimica Acta, vol. 51, 2006, pp. 5912-5919.

Park, S., et al., "Improvement of Capacity Fading Resistance of LiMn2O4 by Amphoteric Oxides", Journal of Power Sources, vol. 180, 2008, pp. 597-601.

$(Li_{1.1}Mn_{1.9}O_4)_{1-x-y} (MgAl_2O_4)_x(Co_3O_4)_y$
(x=0.025, y=0.05)

$Li_{1.1} Mn_{1.9} O_4$

Fig. 12
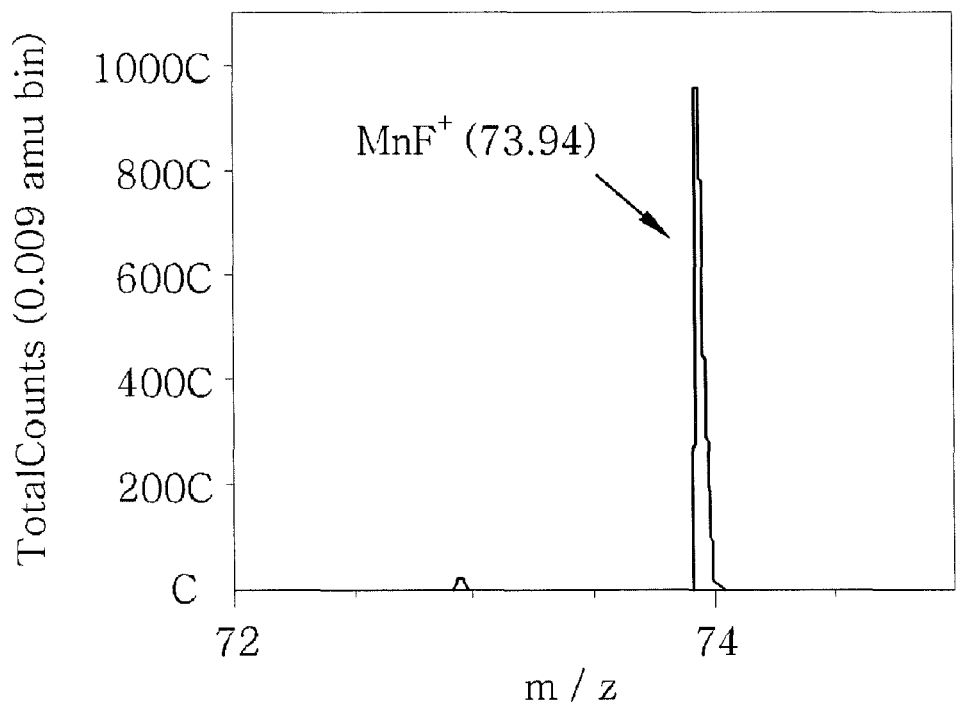
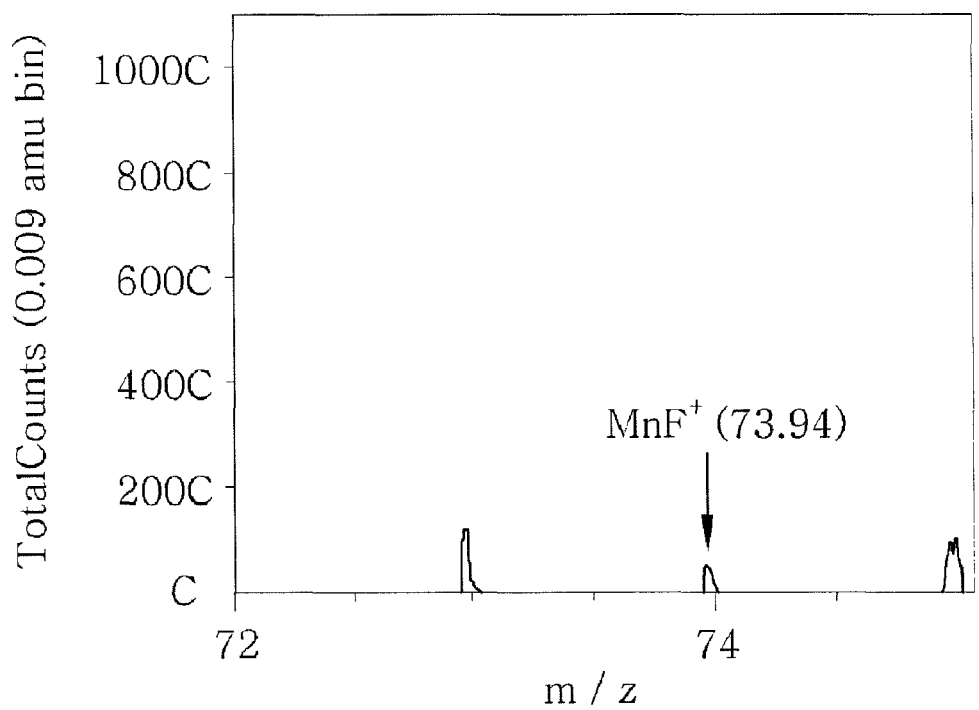

ANODE ACTIVE MATERIAL FOR A RECHARGEABLE LITHIUM BATTERY

This is a National Phase Application filed under 35 U.S.C. 371 as a national stage of PCT/KR2010/007768, filed Nov. 4, 2010, and claiming the benefit from Korean Application No. 10-2009-0108344, filed Nov. 11, 2009 and Application No. 10-2010-0055262, filed Jun. 11, 2010, the content of each of which is hereby incorporated by reference in its entirety.

TECHNICAL FIELD

The present invention relates to an anode active material for rechargeable lithium batteries and a method of manufacturing the same. More particularly, the present invention relates to an anode active material for rechargeable lithium batteries, which exhibits excellent electrochemical characteristics and thermal stability.

BACKGROUND ART

Recently, with the development of portable electronic devices including mobile phones, notebook computers, and the like, along with the commercialization of electric vehicles and hybrid electric vehicles, the need for high capacity rechargeable batteries has rapidly increased. Particularly, since performance of such electric devices mainly depends on rechargeable batteries, there is high demand for high performance batteries.

A rechargeable battery is generally composed of a cathode, an anode, an electrolyte, and the like, and an anode active material is an essential component for supplying lithium ions in the battery. The anode active material serves to supply lithium cations to a cathode through electrochemical reaction and the development of anode active materials is known to be more difficult than that of cathode active materials. As a raw material for the anode active materials, lithium cobalt oxide ($LiCoO_2$) is generally used in the art, but can affect cycle life of the lithium battery through phase change in a high voltage region during operation cycle of the battery (J. Electrochem. Soc., 139 (1992), 2091).

Although $LiNi_{0.8}Co_{0.15}Al_{0.05}O_2$, which has higher capacity than $LiCoO_2$, is also receiving attention, $LiNi_{0.8}Co_{0.15}Al_{0.05}O_2$ active materials suffer from violent price fluctuation associated with the price instability of nickel. In particular, $LiNi_{0.8}Co_{0.15}Al_{0.05}O_2$ causes explosion of the battery due to thermal instability in a charged state (Electrochem. Solid State Lett. 7, A380-A383 (2004)).

As a result, manganese-based materials have received attention as an alternative material in view of stable supply of inexpensive raw materials, no toxicity, and electrochemical and thermal stability. In particular, lithium manganese oxides of a spinel structure, including $LiMnO_2$, $Li_4Mn_5O_{12}$, $Li_2Mn_4O_9$, $LiMn_2O_4$, and $Li_{1.1}Mn_{1.9}O_4$, have attracted. In particular, $Li[(Ni_{0.5}Mn_{0.5})_{1-x}Co_x]O_2$ ($0 \leq x \leq 0.5$) having excellent thermal stability is a strong candidate for next generation high output and large capacity rechargeable lithium batteries.

$Li[(Ni_{0.5}Mn_{0.5})_{1-x}Co_x]O_2$ exhibits relatively high capacity and excellent reversibility. However, since $Li[(Ni_{0.5}Mn_{0.5})_{1-x}Co_x]O_2$ has a smaller amount of Co serving to increase electron conductivity of the material per se than $LiCoO_2$, $Li[(Ni_{0.5}Mn_{0.5})_{1-x}Co_x]O_2$ has unsatisfactory rate capability. In addition, since thermal instability of $Li[(Ni_{0.5}Mn_{0.5})_{1-x}Co_x]O_2$ in a charged state is not overcome (Journal of the Electrochemical Society, 155, A374-A383 (2008)), applicability of $Li[(Ni_{0.5}Mn_{0.5})_{1-x}Co_x]O_2$ to high output and large capacity battery systems is not sufficiently ascertained.

$LiMn_2O_4$ has been studied as an anode active material since it has a spinel structure and exhibits high operating voltage and relatively high reversible capacity. This material employs manganese, which is present in high concentration in the earth's crust, and thus is much cheaper than other active materials. Since this material has slightly lower reversible capacity than $LiCoO_2$ and $LiNiO_2$, there is a difficulty in using this material as an anode active material for a rechargeable lithium ion battery of a portable power source. However, $LiMn_2O_4$ has excellent thermal stability as compared with other anode active materials. For this reason, it is expected that $LiMn_2O_4$ will be applied to an anode active material for medium and large rechargeable lithium ion batteries due to stability thereof.

However, although $LiMn_2O_4$ or $Li_{1.1}Mn_{1.9}O_4$ has good cycle life at room temperature, theses materials have a problem of a rapid decrease in capacity upon continuous charge/discharge operation at high temperature. In particular, dissolution of manganese increases at a high temperature of 40° C. or more, causing rapid deterioration in capacity (Electrochemical and Solid-State Letters, 8, A171 (2005)). Although various attempts, such as substitution of a fluorine atom into a oxygen site, have been made to solve the problem of capacity deterioration caused by dissolution of manganese at high temperature, the problem caused by the manganese dissolution has yet to be overcome (Journal of Power sources, 81-82, 458 (1999)). In other words, capacity deterioration caused by the manganese dissolution has not solved yet, despite substitution of manganese using various elements (Mg, Al, Co, Ni, Fe, Cr, Zn, Cu, etc.). (Journal of Power Sources, 68, 578 (1997); Journal of Power Sources, 68, 582 (1997); Solid State Ionics, 73, 233 (1994); Journal of Electrochemical Society, 143, 1607 (1996); Proceeding of 11th International Conference on Solid State Ionics, Honolulu, 1997, p. 23; Journal of Power Sources, 68, 604 (1997); Journal of Solid State Chemistries, 132, 372 (1997); Solid State Ionics, 118, 179 (1999); Chemistry of Materials, 7, 379 (1995); Journal of Electrochemical Society, 145, 1238 (1998); Materials Chemistry and Physics, 87, 162 (2004)); Journal of Power Sources, 102, 326 (2001))

Even in the case in which $LiMn_2O_4$ or $Li_{1.1}Mn_{1.9}O_4$ is formed through surface coating or complex formation at a nanometer scale with stable MgO, $Al_2O_3$ and $Co_3O_4$, capacity deterioration caused by dissolution of manganese cannot be solved (Solid State Ionics, 167, 237 (2004); Electrochem. Solid-State Lett. 5 A167 (2002); Chem. Commun. 2001, 1074).

Therefore, there is a need for a new spinel type anode active material, which can suppress manganese dissolution in a spinel type $LiMn_2O_4$ or $Li_{1.1}Mn_{1.9}O_4$ and has stable cycle lifespan at high temperature.

DISCLOSURE

Technical Problem

The present invention is directed to providing an anode active material for rechargeable lithium batteries, in which spinel type $MgAl_2O_4$ is substituted into a basic spinel structure represented by $Li_{1.1}Mn_{1.9}O_4$ to provide structural stability and spinel type $Co_3O_4$ is substituted into the basic spinel structure of $Li_{1.1}Mn_{1.9}O_4$ to improve electronic conductivity, thereby improving battery performance.

In addition, the present invention is directed to providing a spinel type anode active material for rechargeable lithium batteries, which has excellent lifespan characteristics by suppressing manganese dissolution at high temperature.

Technical Solution

In accordance with one aspect of the present invention, an anode active material for rechargeable lithium batteries includes a spinel type anode active material $(Li_{1.1}Mn_{1.9}O_4)_{1-x-y}(MgAl_2O_4)_x(Co_3O_4)_y$ ($0.001 \leq x \leq 0.2$, $0.001 \leq y \leq 0.2$), which is formed by substituting spinel type $(MgAl_2O_4)_x$ and spinel type $(Co_3O_4)_y$ into a basic spinel structure represented by $(Li_{1.1}Mn_{1.9}O_4)_{1-x-y}$.

The spinel type anode active material may be mixed with metal oxide nanoparticles MO (5 to 500 nm) (where M represents one of Mg, Co and Ni, and has a valence of 2).

The metal oxide nanoparticles MO may act as scavengers of HF generated by decomposition of an electrolyte.

The metal oxide nanoparticles may be mixed in an amount of 0.01 to 10% by weight (wt %) with the spinel type anode active material.

In accordance with another aspect of the present invention, a method of preparing an anode active material for rechargeable lithium batteries includes heat treating a mixture of $Li_2CO_3$, $MnO_2$, MgO, $Al_2O_3$ and $Co_3O_4$ at 900 to 1000° C. in air or an oxygen atmosphere for 10 to 48 hours to generate a lithium-containing oxide; generating metal oxide nanoparticles MO (5 to 500 nm) (where M represents one of Mg, Co and Ni, and has a valence of 2); and dry or wet mixing 0.01 to 10 wt % of the pulverized metal oxide nanoparticles with the lithium-containing oxide to form an anode active material.

Advantageous Effects

As such, in the anode active material for rechargeable lithium batteries according to the present invention, spinel type $MgAl_2O_4$ is substituted into a basic spinel structure represented by $Li_{1.1}Mn_{1.9}O_4$ to provide structural stability and spinel type $Co_3O_4$ is substituted into the basic spinel structure of $Li_{1.1}Mn_{1.9}O_4$ to improve electronic conductivity, thereby improving battery performance.

In addition, according to the present invention, the spinel type anode active material for rechargeable lithium batteries and the method of manufacturing the same provide excellent lifespan characteristics by suppressing manganese dissolution at high temperature as much as possible. Specifically, hydrogen fluoride (HF) generated by decomposition of an electrolyte salt easily dissolves manganese in the spinel $LiMn_2O_4$. Thus, the content of hydrogen fluoride (HF) in the electrolyte is lowered to suppress manganese dissolution as much as possible by adding metal oxide nanoparticles MO (where M represents one of Mg, Co and Ni, and has a valence of 2) having high electro negativity in order to realize performance of the spinel anode active material, so that the anode active material may achieve low price, high output, long lifespan and high capacity of rechargeable lithium batteries, as compared with the conventional anode active material.

DESCRIPTION OF DRAWINGS

FIG. 12 shows time-of flight secondary ion mass analysis spectra of $MnF^+$ secondary ion fragment of $Li_{1.1}Mn_{1.9}O_4$ (left) and $MnF^+$ secondary ion fragment of $(Li_{1.1}Mn_{1.9}O_4)_{1-x-y}(MgAl_2O_4)_x(CoO)_y$ (x=0.025, y=0.05, 10 wt % of CoO nanoparticles) (right) after long-term cycling, using time of flight secondary ion mass spectroscopy.

BEST MODE

Figure 1:
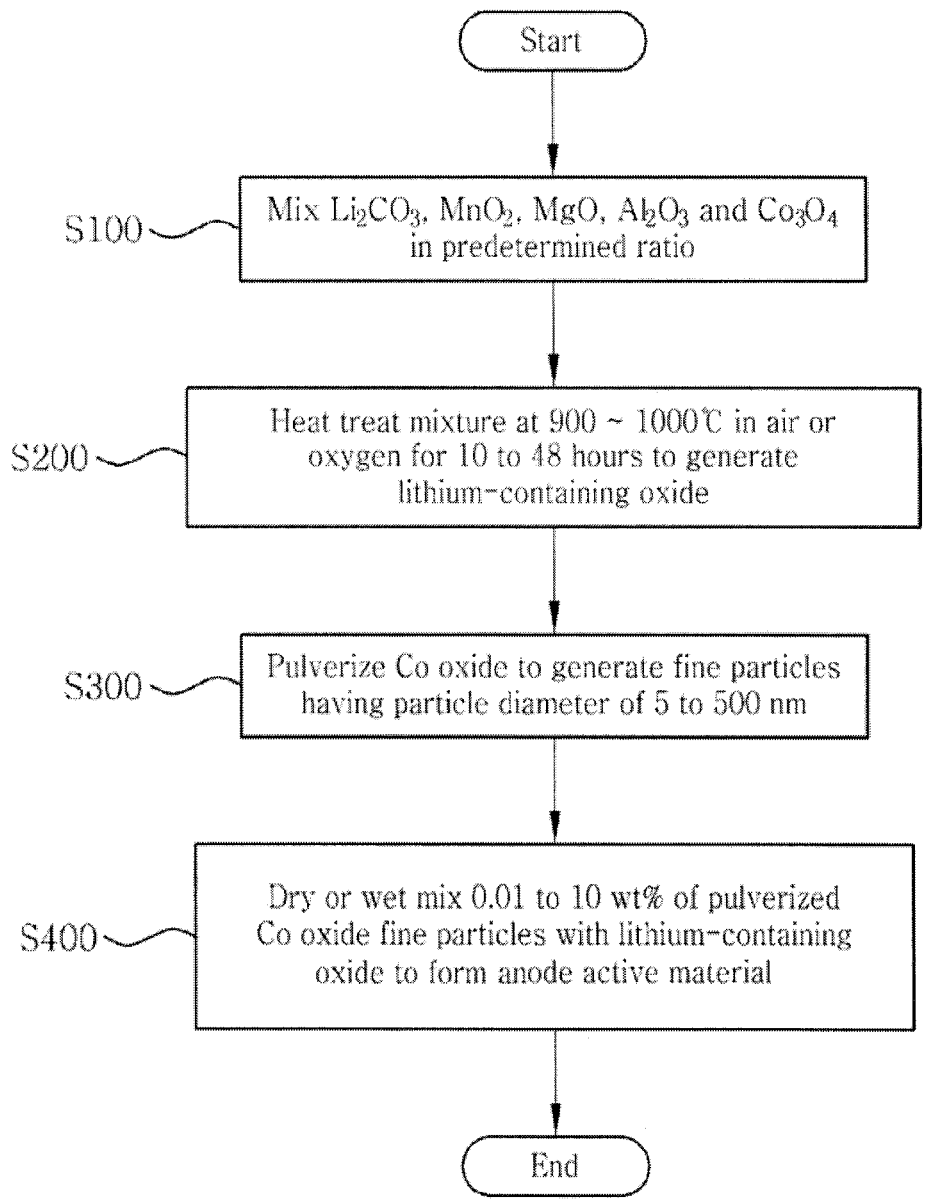
FIG. 1 is a flowchart of a method of preparing an anode active material for rechargeable lithium batteries in accordance with one embodiment of the present invention.

Details of embodiments are included in the detailed description and the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

Next, an anode active material for rechargeable lithium batteries and a method of manufacturing the same according to exemplary embodiments of the present invention will be described with reference to the accompanying drawings.

An anode active material for rechargeable lithium batteries according to one exemplary embodiment includes a spinel type anode active material represented by $(Li_{1.1}Mn_{1.9}O_4)_{1-x-y}(MgAl_2O_4)_x(Co_3O_4)_y$ ($0.001 \leq x \leq 0.2$, $0.001 \leq y \leq 0.2$), which is formed by substituting spinel type $(MgAl_2O_4)_x$ and spinel type $(Co_3O_4)_y$ into a basic spinel structure represented by $(Li_{1.1}Mn_{1.9}O_4)_{1-x-y}$.

Specifically, in the anode active material for the rechargeable lithium battery, thermodynamically stable MgO and $Al_2O_3$ are converted into $MgAl_2O_4$ of a cubic spinel structure, which is more thermodynamically stable than MgO and $Al_2O_3$, and $Co_3O_4$ of a cubic spinel structure is substituted into the basic spinel structure of $Li_{1.1}Mn_{1.9}O_4$ to form the spinel type anode active material represented by $(Li_{1.1}Mn_{1.9}O_4)_{1-x-y}(MgAl_2O_4)_x(Co_3O_4)_y$ ($0.001 \leq x \leq 0.2$, $0.001 \leq y \leq 0.2$) in order to enhance electronic conductivity, thereby providing structural stability while improving battery performance.

Further, the spinel type anode active material may be mixed with metal oxide nanoparticles MO (5 to 500 nm) (where M represents one of Mg, Co and Ni, and has a valence of 2).

Here, the metal oxide nanoparticles MO provided as an additive act as scavengers of HF generated by decomposition of an electrolyte.

Specifically, the metal oxide nanoparticles MO (5 to 500 nm) (where M represents one of Mg, Co and Ni, and has a valence of 2) provided as an additive act as scavengers of HF generated by decomposition of the electrolyte, such that the spinel type anode active material may be used as an anode active material of spinel type $LiMn_2O_4$ for rechargeable lithium ion batteries, thereby realizing low price, high output, long lifespan and high capacity of the rechargeable lithium batteries.

Further, the metal oxide nanoparticles may be mixed in an amount of 0.01 to 10 wt % with the spinel type anode active material.

Next, referring to FIG. 1, a method of preparing an anode active material for rechargeable lithium batteries according to one exemplary embodiment will be described in detail.

The method of preparing an anode active material for rechargeable lithium batteries includes heat treating a mixture of $Li_2CO_3$, $MnO_2$, MgO, $Al_2O_3$ and $Co_3O_4$ at 900 to 1000° C. in air or an oxygen atmosphere for 10 to 48 hours to generate a lithium-containing oxide; generating metal oxide nanoparticles MO (5 to 500 nm) (where M represents one of Mg, Co and Ni, and has a valence of 2); and dry or wet mixing 0.01 to 10 wt % of the pulverized metal oxide nanoparticles with the lithium-containing oxide to form an anode active material.

Specifically, the anode active material for rechargeable lithium batteries prepared by the method according to the embodiment is a spinel type anode active material represented by $(Li_{1.1}Mn_{1.9}O_4)_{1-x-y}(MgAl_2O_4)_x(Co_3O_4)_y$, ($0.001 \leq x \leq 0.2$, $0.001 \leq y \leq 0.2$), which is formed by substituting spinel type ($MgAl_2O_4$) and spinel type ($Co_3O_4$) into a basic spinel structure represented by $(Li_{1.1}Mn_{1.9}O_4)_{1-x-y}$.

In the method according to this embodiment, first, $Li_2CO_3$, $MnO_2$, MgO, $Al_2O_3$, and $Co_3O_4$ are mixed in a predetermined ratio (in S100).

Here, $Li_2CO_3$, $MnO_2$, MgO, $Al_2O_3$, and $Co_3O_4$ are used as starting materials and may be prepared as particles having a particle size of 20 micrometers or less in order to generate a single phase.

Then, the mixture is subjected to heat treatment at 900 to 1000° C. in air or an oxygen atmosphere for 10 to 48 hours to generate a lithium-containing oxide (in S200).

Here, although initial capacity increases with decreasing calcination temperature, there is a problem of poor lifespan characteristics in this case. As the calcination temperature increases, the elution amount of manganese advantageously decreases due to a decrease in specific surface area. Therefore, according to the present invention, while a suitable calcination temperature for effectively reducing the elution amount of manganese is maintained, thermodynamically stable MgO and $Al_2O_3$ are converted into $MgAl_2O_4$ of a cubic spinel structure, which is more thermodynamically stable than MgO and $Al_2O_3$, and $Co_3O_4$ of a cubic spinel structure is substituted into a basic spinel structure of $Li_{1.1}Mn_{1.9}O_4$ to form a spinel type anode active material represented by $(Li_{1.1}Mn_{1.9}O_4)_{1-x-y}(MgAl_2O_4)_x(Co_3O_4)_y$ ($0.001 \leq x \leq 0.2$, $0.001 \leq y \leq 0.2$) in order to enhance electronic conductivity, thereby providing significantly improved structural stability while enhancing electronic conductivity.

Then, metal oxide MO (where M represents one of Mg, Co and Ni, and has a valence of 2) is pulverized to generate metal oxide nanoparticles having a particle diameter of 5 to 500 nm (in S300).

Finally, the pulverized metal oxide nanoparticles are mixed in an amount of 0.01 to 10 wt % with the lithium-containing oxide to form an anode active material (in S400).

Herein, the "metal oxide nanoparticles" are prepared using an electrochemically inactive metal oxide that has a different composition than that of the anode active material for rechargeable lithium batteries. When such metal oxide nanoparticles are uniformly dispersed with the lithium-containing oxide for the anode active material, reaction between the metal oxide nanoparticles and HF generated by decomposition of an electrolyte salt predominantly occurs during charge/discharge operation of the battery such that reaction between HF and the spinel anode active material for rechargeable lithium batteries is suppressed, thereby significantly improving a capacity maintaining rate of the anode active material.

As for such metal oxide nanoparticles, metal oxide having high free energy for formation and high electro negativity may be used. Particularly, CoO, NiO, and MgO may be selectively used in various ways according to characteristics of metal oxide.

As described above, the metal oxide nanoparticles are uniformly mixed with the lithium-containing oxide for the anode active material through dry or wet mixing.

Here, any typical dry or wet mixing process known in the art may be used, without being limited to a particular process. For example, the metal oxide nanoparticles may be mixed with a solvent having high volatility under conditions suitably regulated according to the metal oxide nanoparticles.

Here, the amount of the metal oxide nanoparticles may be suitably regulated so as to improve electrochemical characteristics of the anode active material. When the metal oxide nanoparticles are mixed in an amount of 10 wt % or less, preferably 0.01 to 10 wt %, with the anode active material, it is possible to prevent a reduction in the total capacity of the battery.

If the amount of the metal oxide nanoparticles is less than 0.01 wt %, the metal oxide nanoparticles do not provide sufficient effects. On the contrary, if the amount of the metal oxide nanoparticles exceeds 10 wt %, the total capacity of the battery is reduced due to excess of the metal oxide nanoparticles which are electrochemically inactive.

Meanwhile, an anode according to the present invention may be manufactured using the anode active material through a known process.

For example, the anode active material is placed together with a coupling agent such as polyvinylidone and a conductive agent such as acetylene black, carbon black, and the like in an organic solvent such as N-methyl-2-pyrrolidone to prepare a slurry composition for an anode active material, which in turn is coated and dried on a current collector such as an aluminum foil, thereby providing an anode.

Carbon or lithium is used as a cathode material. Then, a separator is interposed between the cathode and the anode, which in turn are inserted into a stainless steel and an aluminum pouch, or case constituting an exterior member of a battery, followed by supplying a liquid electrolyte and sealing to manufacture a rechargeable lithium battery.

Next, X-ray diffraction patterns of anode active materials for rechargeable lithium batteries according to one embodiment of the present invention, which are represented by $Li_{1.1}Mn_{1.9}O_4$ and $(Li_{1.1}Mn_{1.9}O_4)_{1-x-y}(MgAl_2O_4)_x(Co_3O_4)_y$, (x=0.025, y=0.05; x=0.2, y=0.2), will be described with reference to FIG. 2.

Figure 2:
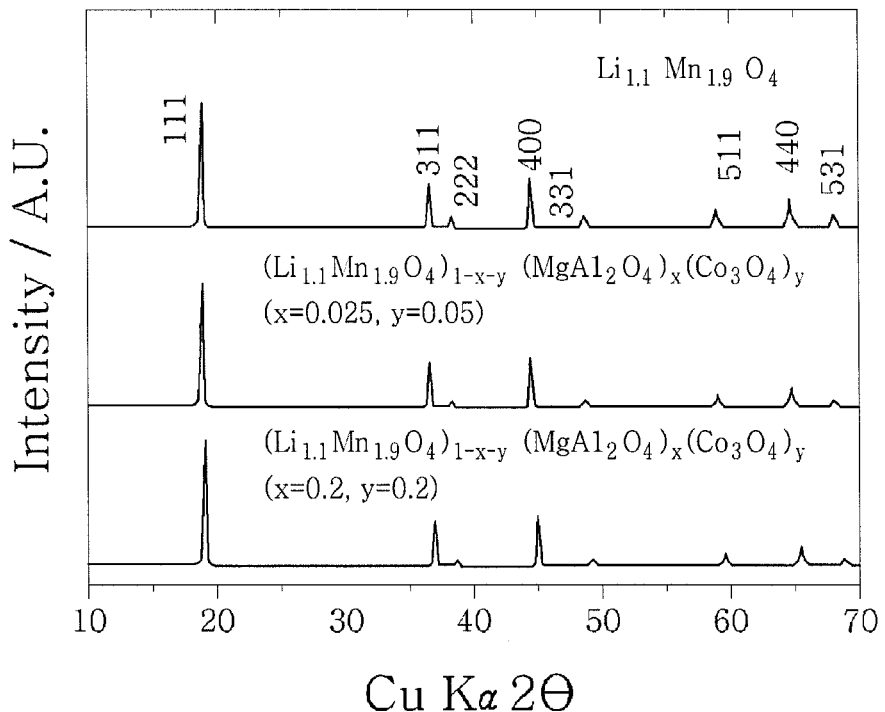
FIG. 2 is a graph depicting X-ray diffraction patterns of $Li_{1.1}Mn_{1.9}O_4$ and $(Li_{1.1}Mn_{1.9}O_4)_{1-x-y}(MgAl_2O_4)_x(Co_3O_4)_y$ (x=0.025, y=0.05; x=0.2, y=0.2)

Referring to FIG. 2, an upper part of the graph relates to $Li_{1.1}Mn_{1.9}O_4$, and a lower part of the graph relates to $(Li_{1.1}Mn_{1.9}O_4)_{1-x-y}(MgAl_2O_4)_x(Co_3O_4)_y$, (x=0.025, y=0.05; x=0.2, y=0.2), both of which have a single phase spinel structure.

For $Li_{1.1}Mn_{1.9}O_4$, lattice parameter a=8.207 Å,

For $(Li_{1.1}Mn_{1.9}O_4)_{1-x-y}(MgAl_2O_4)_x(Co_3O_4)_y$, (x=0.025, y=0.05), lattice parameter a=8.188 Å.

For $(Li_{1.1}Mn_{1.9}O_4)_{1-x-y}(MgAl_2O_4)_x(Co_3O_4)_y$, (x=0.2, y=0.2), lattice parameter a=8.138 Å.

It can be seen that since Al (0.53 Å) and Co (0.535 Å) both having relatively small ionic radii are substituted into sites of $Mn^{3+}$ (0.65 Å) having a relatively large ionic radius, the lattice parameter is reduced.

In viewpoint of thermodynamics, thermodynamically stable MgO and $Al_2O_3$ are converted into $MgAl_2O_4$ of a cubic spinel structure, which is more thermodynamically stable than MgO and $Al_2O_3$, and $Co_3O_4$ of a cubic spinel structure is substituted into the basic spinel structure in order to enhance electronic conductivity, thereby providing significantly improved structural stability while enhancing electronic conductivity.

Next, initial discharge curves of half cells of $Li_{1.1}Mn_{1.9}O_4$ and $(Li_{1.1}Mn_{1.9}O_4)_{1-x-y}(MgAl_2O_4)_x(Co_3O_4)_y$, (x=0.025, y=0.05; x=0.2, y=0.2) will be described with reference to FIG. 3.

Figure 3:
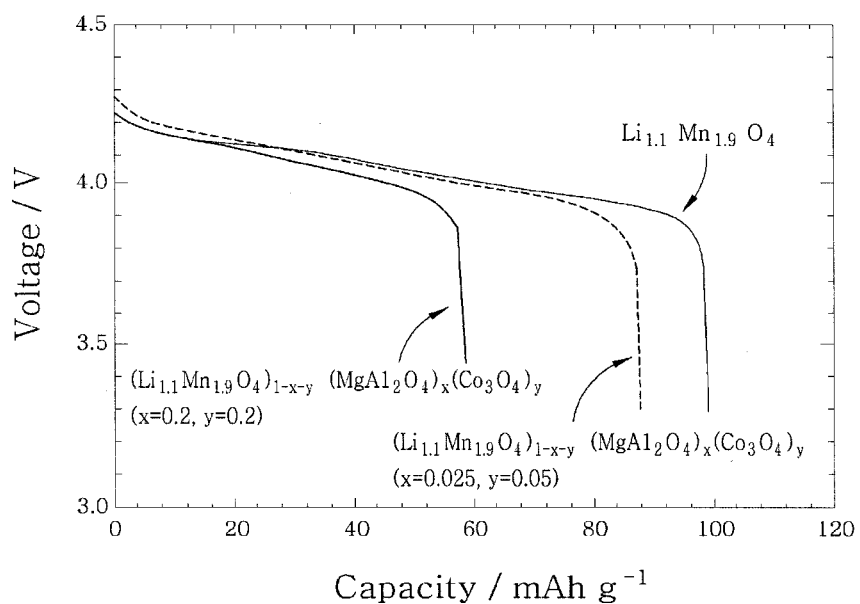
FIG. 3 is a graph depicting initial discharge curves of half cells of $Li_{1.1}Mn_{1.9}O_4$ and $(Li_{1.1}Mn_{1.9}O_4)_{1-x-y}(MgAl_2O_4)_x(Co_3O_4)_y$ (x=0.025, y=0.05; x=0.2, y=0.2)

Referring to FIG. 3, testing was performed under conditions wherein an electric current was 100 mA/g (1 C) and operating temperature was 25° C., and $Li_{1.1}Mn_{1.9}O_4$ had an inherent flat voltage region of the spinel structure at 4V and a capacity of about 100 mAh/g.

Further, for $(Li_{1.1}Mn_{1.9}O_4)_{1-x-y}(MgAl_2O_4)_x(CO_3O_4)_y$, (x=0.025, y=0.05), since $MgAl_2O_4$ and $Co_3O_4$ are substituted into some of electrochemically active Mn3+ sites, electrochemical activity is reduced by the substituted amount of $Mn^{3+}$, causing a reduction of capacity to about 88 mAh/g. However, lattice energy increases due to improvement of structural stability, thereby enabling an increase in operating voltage in a zone of 4V or more.

For $(Li_{1.1}Mn_{1.9}O_4)_{1-x-y}(MgAl_2O_4)_x(CO_3O_4)_y$, (x=0.2, y=0.2), the discharge capacity was about 60 mAh/g.

Next, lifespan characteristics of $Li_{1.1}Mn_{1.9}O_4$ and $(Li_{1.1}Mn_{1.9}O_4)_{1-x-y}(MgAl_2O_4)_x(CO_3O_4)_y$, (x=0.025, y=0.05; x=0.2, y=0.2) will be described with reference to FIG. 4.

Figure 4:
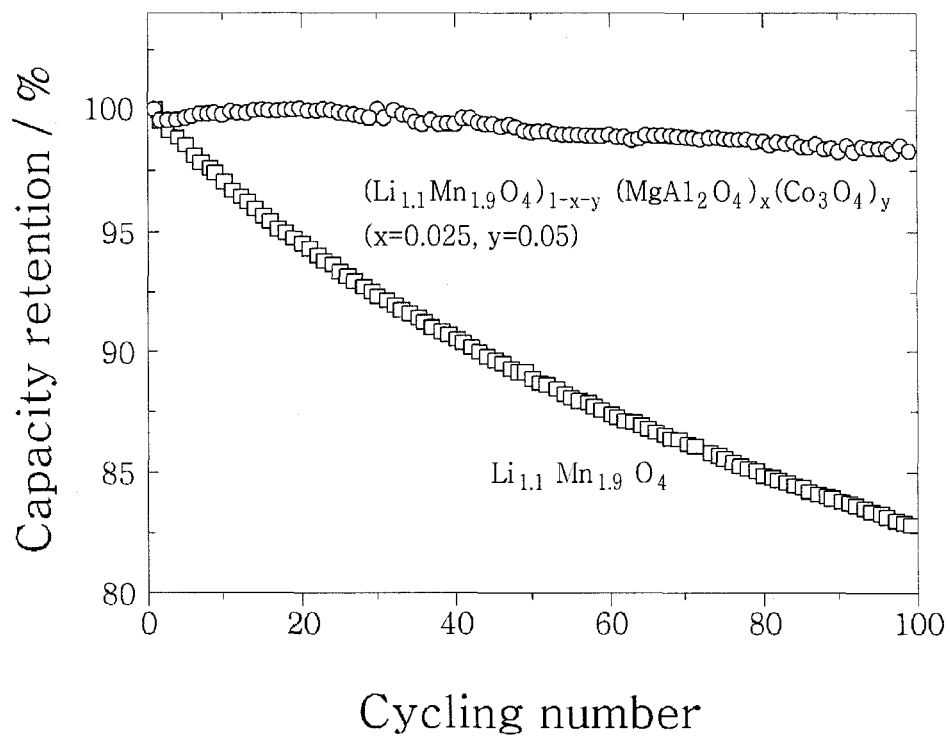
FIG. 4 is a graph depicting lifespan characteristics of $Li_{1.1}Mn_{1.9}O_4$ and $(Li_{1.1}Mn_{1.9}O_4)_{1-x-y}(MgAl_2O_4)_x(Co_3O_4)_y$ (x=0.025, y=0.05; x=0.2, y=0.2)

Referring to FIG. 4, testing was performed under conditions wherein an applied current was 100 mA/g (1 C) and operating temperature was 60° C., spinel type $Li_{1.1}Mn_{1.9}O_4$ underwent elution of manganese from the active material to an electrolyte over repeated cycling and such elution of Mn was accelerated at high temperature. This phenomenon is caused by the following reaction:

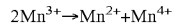

$$2Mn^{3+} \rightarrow Mn^{2+} + Mn^{4+}$$

In this reaction, $Mn^{4+}$ couples with a lithium ion in the electrolyte to form electrochemically inactive $Li_2MnO_3$, and $Mn^{2+}$ forms other complexities, which are attached to a cathode surface and reduced into metal, causing an increase of cell resistance.

Accordingly, as can be seen in FIG. 4, the capacity is rapidly reduced at 60° C. due to this reaction.

On the contrary, for a spinel type anode active material represented by $(Li_{1.1}Mn_{1.9}O_4)_{1-x-y}(MgAl_2O_4)_x(Co_3O_4)_y$, (x=0.025, y=0.05), $MgAl_2O_4$ is substituted into the structure of $Li_{1.1}Mn_{1.9}O_4$, thereby further securing structural stability, and $Co_3O_4$ is also substituted into the structure of $Li_{1.1}Mn_{1.9}O_4$, thereby further enhancing electronic conductivity, so that the battery can maintain a capacity of about 97% of an initial capacity thereof even after cycling at 60 to 100° C.

Figure 5:
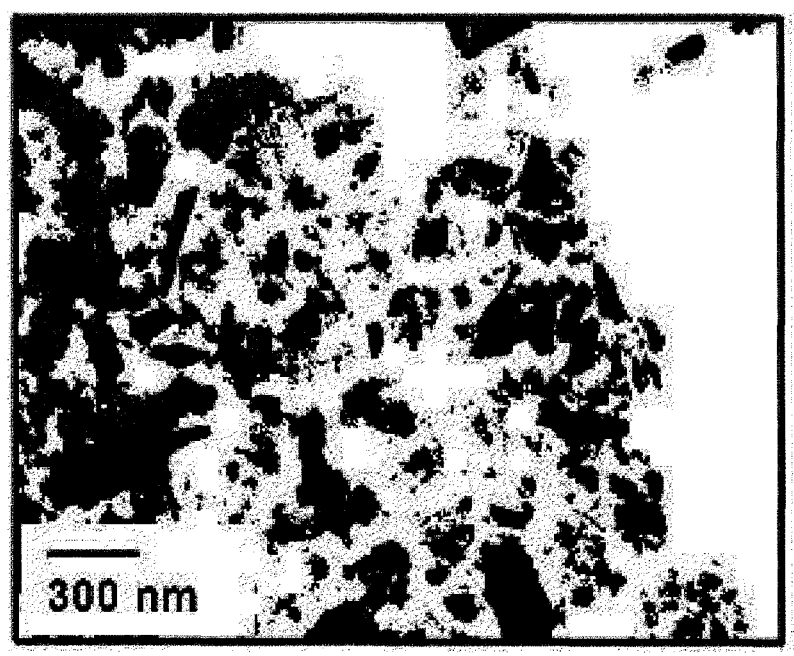
FIG. 5 is a transmission electron micrograph of CoO nanopowders.

FIG. 5 is a transmission electron micrograph of CoO nanoparticles. As can be seen from this transmission electron micrograph, CoO powder is pulverized using a ball mill, thereby providing fine particles having a particle size of 300 nm or less.

Figure 6:
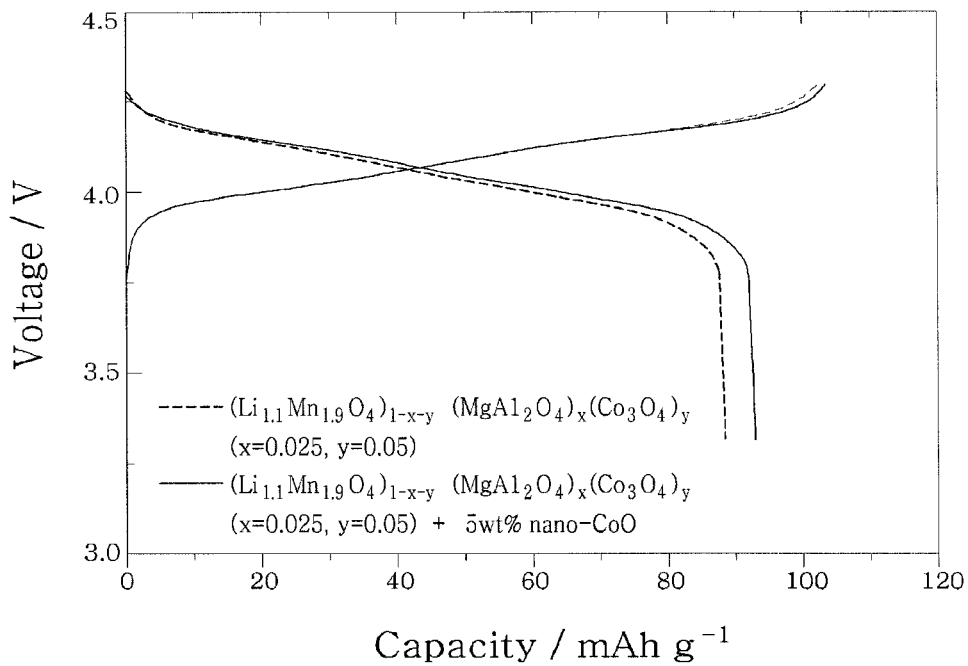
FIG. 6 is a graph depicting an initial charge/discharge curve of a spinel electrode in a half cell, which includes CoO nanoparticles.

Next, an initial charge/discharge curve of a spinel electrode including CoO nanoparticles in a half cell will be descried with reference to FIG. 6.

Referring to FIG. 6, testing was performed under conditions wherein an applied current was 100 mA/g (1 C) and operating temperature was 25° C. the spinel electrode including the CoO nanoparticles had a high discharge voltage, causing resistance reduction and capacity increase.

Therefore, it can be seen that the cell including the CoO nanoparticles exhibits further improved characteristics of a half cell.

Next, cycling characteristics of the spinel electrode including CoO nanoparticles in a half cell will be described with reference to FIG. 7.

Figure 7:
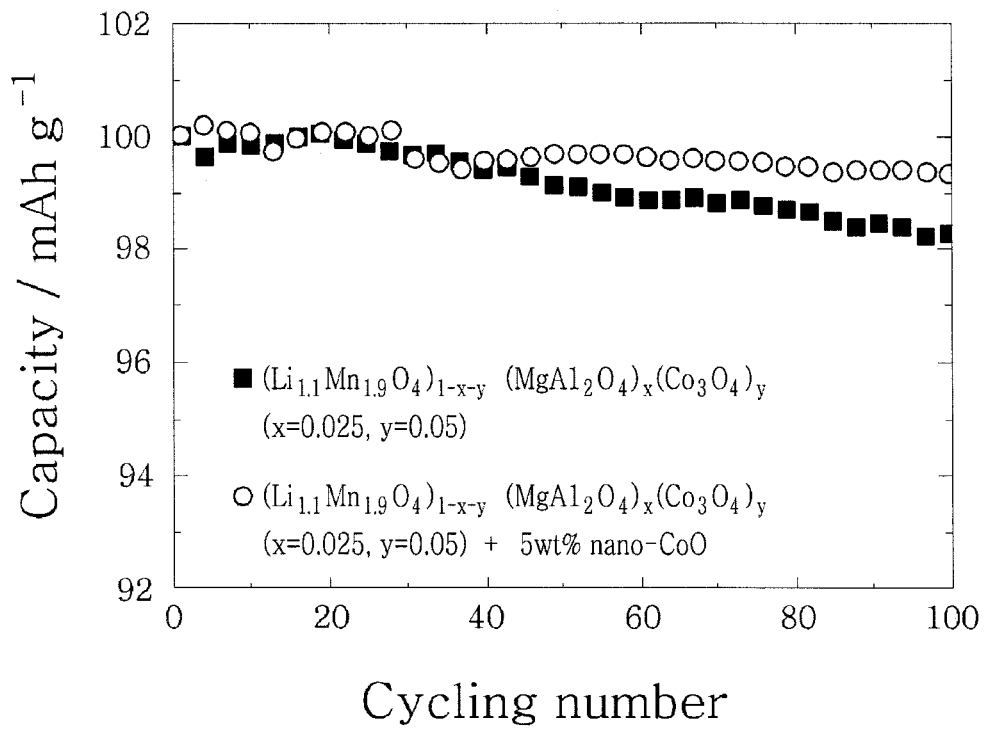
FIG. 7 is a graph depicting cycle characteristics of the spinel electrode in a half cell, which includes CoO nanoparticles.

Referring to FIG. 7, testing was performed under conditions wherein an applied current was 100 mA/g (1 C) and operating temperature was 60° C., the spinel electrode including the CoO nanoparticles exhibits further improved characteristics of a half cell even under high temperature cycling at an operating temperature of 60° C.

Next, cycling characteristics of a spinel electrode including CoO nanoparticles in a full cell will be described with reference to FIG. 8.

Figure 8:
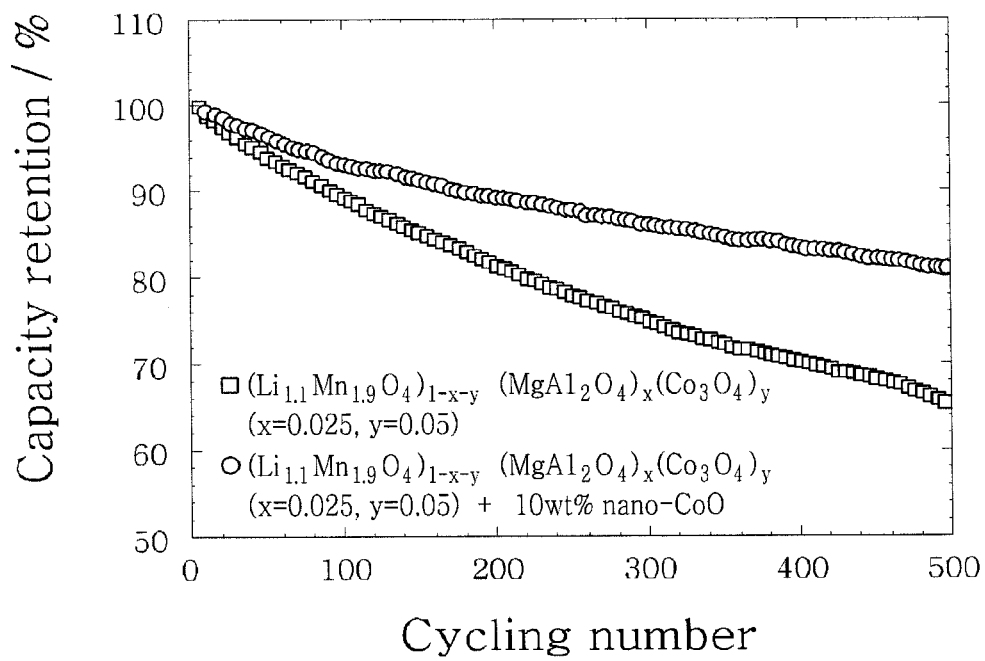
FIG. 8 is a graph depicting cycle characteristics of a spinel electrode in a full cell, which includes CoO nanoparticles.

Referring to FIG. 8, testing was performed under conditions wherein an applied current was 100 mA/g (1 C) and operating temperature was 60° C., the spinel electrode including the CoO nanoparticles exhibits further improved characteristics of a full cell even in high temperature cycling at an operating temperature of 60° C.

Particular, claim 10 of Patent Publication No. 2000-0029333 (May 25, 2000) discloses that cobalt oxide has a lattice parameter of 8.10±0.05 Å (space group Fd3m, cubic spinel). In this publication, $Co_3O_4$ oxide coating is used as cobalt oxide of the cubic spinel structure. According to the present invention, cobalt oxide (CoO, lattice parameter a=4.26±0.05 Å) having a space group of Fm3m is used as an additive.

The present invention is focused on the function of CoO capable of scavenging HF. An electrolyte for lithium batteries contains about 50 ppm or less of water ($H_2O$). When reacting with water, electrolyte salt $LiPF_6$ is easily decomposed and such decomposition is accelerated with increasing temperature (40 to 60° C.) causing the following chemical reactions:

$$LiPF_6 \rightarrow LiF\downarrow + PF_5 \qquad (1)$$

$$PF_5 + H_2O \rightarrow POF_3 + 2HF \qquad (2)$$

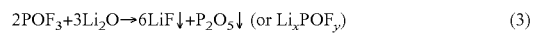

$$2POF_3 + 3Li_2O \rightarrow 6LiF\downarrow + P_2O_5\downarrow \text{ (or } Li_xPOF_y\text{)} \qquad (3)$$

Then, HF continues to decompose the anode active material, thereby causing severe elution of Mn through the following reaction.

$$2Mn^{3+} \rightarrow Mn^{2+} + Mn^{4+} \qquad (4)$$

Figure 9:
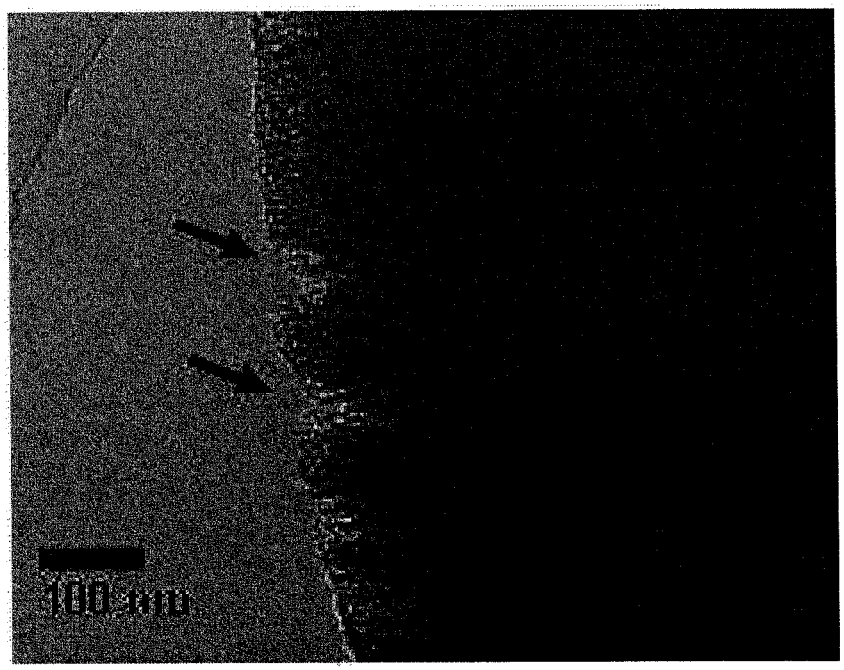
FIG. 9 is a transmission electron micrograph of $Li_{1.1}Mn_{1.9}O_4$ powder after cycling.

As shown in the transmission electron micrograph (TEM, Hitachi Co., Ltd., S-800) of FIG. 9, the anode active material undergoes severe decomposition through the above reaction.

On the other hand, as can be seen from FIGS. 7 and 8, the spinel electrode including the CoO nanoparticles provides excellent cycling characteristics upon charge/discharge operation. The reason for this result is that the CoO nanoparticles react with HF generated by decomposition of the electrolyte salt to scavenge HF according to the following reaction.

$$CoO + 2HF \rightarrow CoF_2 + H_2O \quad (5)$$

Figure 10:
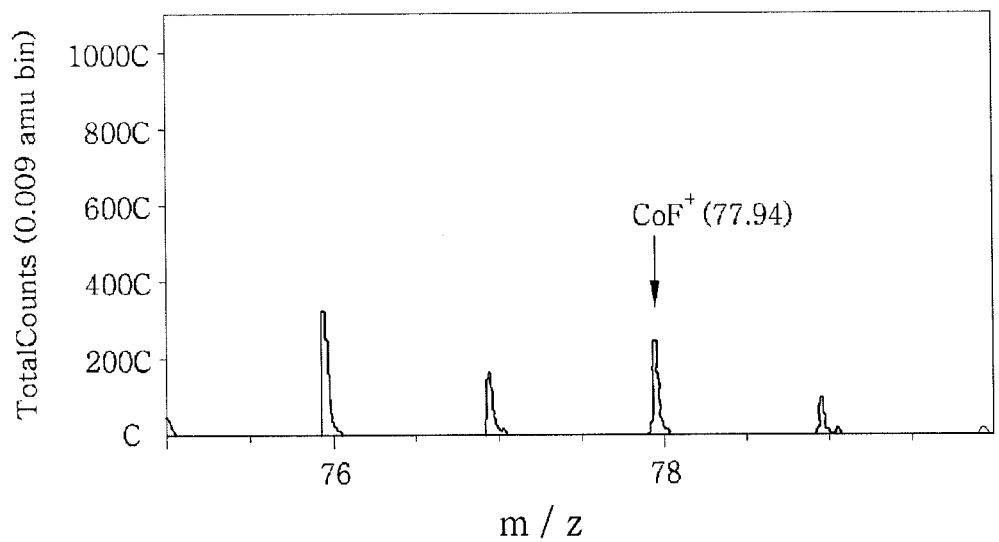
FIG. 10 shows time of flight secondary mass analysis spectra of $(Li_{1.1}Mn_{1.9}O_4)_{1-x-y}(MgAl_2O_4)_x(CoO)_y$ (x=0.025, y=0.05, 10 wt % of CoO nanoparticles) powder after long-term cycling, using a time of flight secondary ion mass spectroscopy.

As a proof of HF scavenging, a time-of flight secondary mass analysis spectrum of $(Li_{1.1}Mn_{1.9}O_4)_{1-x-y}(MgAl_2O_4)_x(CoO)_y$, (x=0.025, y=0.05, 10 wt % of CoO nanoparticles) powder using time-of flight secondary ion mass spectroscopy after long-term cycling is shown in FIG. 10.

As can be seen from FIG. 10, which shows the spectrum having a relatively strong secondary ion fragment of $CoF^+$ at a mass of 77.94, CoO nanoparticles scavenged HF according to the above reaction formula (5).

Generally, since CoO ($\Delta_f G$=−214 kJ/mol at 25° C., free energy of formation) is less stable than $Co_3O_4$ ($\Delta_f G$=−774 kJ/mol at 23'C), it is considered that CoO more easily scavenges HF and is more effective than $Co_3O_4$.

Figure 11:
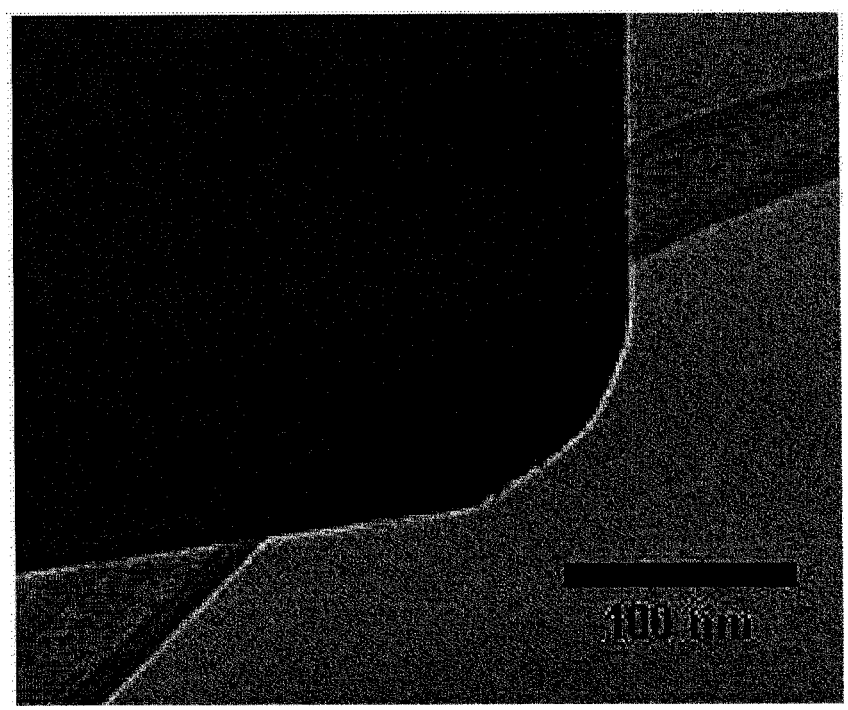
FIG. 11 is a transmission electron micrograph of $(Li_{1.1}Mn_{1.9}O_4)_{1-x-y}(MgAl_2O_4)_x(CoO)_y$ (x=0.025, y=0.05, 10 wt % of CoO nanoparticles) powder after cycling.

Thus, as shown in FIG. 11, when observing $(Li_{1.1}Mn_{1.9}O_4)_{1-x-y}(MgAl_2O_4)_x(CoO)_y$, (x=0.025, y=0.05, 10 wt % of CoO nanoparticles) powder using a transmission electron micrograph (TEM) after cycling, it can be seen that since CoO scavenges HF and prevents elution of Mn even after cycling, the particle shape of the anode active material does not change as compared with that of the anode active material before the charge/discharge operation.

According to this result, it can be concluded that addition of the metal oxide nanoparticles as in the present invention will lead to further improvement of cell characteristics as compared with use of a thin oxide coating.

As shown in FIG. 12, eluted manganese oxidizes into MnO and reacts with HF, thereby generating a compound of $MnF_2$ via the following reaction.

$$MnO + 2HF \rightarrow MnF_2 + H_2O \quad (6)$$

As a result, it can be seen that the powder represented by $(Li_{1.1}Mn_{1.9}O_4)_{1-x-y}(MgAl_2O_4)_x(CoO)_y$ (x=0.025, y=0.05, 10 wt % of CoO nanoparticles) effectively scavenges HF, thereby significantly reducing elution of Mn as shown in FIG. 12.

From this result, it can be concluded that it is possible to provide further improvement of the properties of the material using functionality of the nanopowders.

Further, the anode active material for rechargeable lithium batteries according to the present invention may be widely applied to high performance rechargeable lithium batteries for mobile information communication devices, such as mobile phones, PDAs (personal digital assistants), MP3 players, camcorders, notebook computers, and the like, and rechargeable batteries for high output large vehicles, such as electric vehicles, hybrid electric vehicles (HEV) and the like.

Next, the present invention will be described with reference to examples. Here, it should be understood that the following examples are provided for illustration only and do not limit the scope of the present invention.

Example 1

Preparation of Anode Active Material for Rechargeable Lithium Batteries

As starting materials, lithium carbonate ($Li_2CO_3$), manganese oxide ($MnO_2$), magnesium oxide (MgO), aluminum oxide ($Al_2O_3$), and cobalt oxide ($Co_3O_4$) were prepared. The anode active material has a composition of $(Li_{1.1}Mn_{1.9}O_4)_{1-x-y}(MgAl_2O_4)_x(Co_3O_4)_y$, (0.001≤x≤0.2, 0.001≤y≤0.2).

These starting materials were placed in ethanol, followed by wet mixing and drying at about 110° C. for 24 hours. Then, the mixture was subjected to heat treatment at 500° C. for about 10 hours and at 900 to 1000° C. in air or oxygen for 10 to 48 hours, thereby preparing the anode material having the above composition.

Example 2

Preparation of Metal Oxide Nanoparticles

Cobalt oxide (CoO) powder was pulverized using a ball mill to a particle size ranging from 5 to 500 nm. The pulverized nanoparticles were heated to 80° C. to remove moisture therefrom.

Example 3

The prepared $(Li_{1.1}Mn_{1.9}O_4)_{1-x-y}(MgAl_2O_4)_x(Co_3O_4)_y$ (x=0.025, y=0.05) was uniformly mixed with the pulverized cobalt oxide (CoO) nanoparticles in a weight ratio of 95:5.

The active material, polyvinylidene fluoride as a binder, and carbon black as a conductive agent were dispersed in a weight ratio of 95:2:3 in NMP (N-methylpyrrolidone) to prepare a slurry. The slurry was coated to a thickness of 100 micrometers on an Al foil using a doctor blade, followed by evaporation of NMP at 120° C., pressing at a predetermined pressure, and cutting to a predetermined size, thereby preparing an anode plate.

As a cathode plate, a lithium foil was cut to the same size as the anode plate, followed by a typical process for preparing a half cell.

Then, with a separator interposed between the cathode plate and the anode plate, the resultant assembly was subjected to heating and compression, and inserted into a coin cell provided as a battery case, followed by injecting a liquid electrolyte and sealing the coin cell, thereby providing a rechargeable lithium battery.

The separator was obtained from Celgard Co., Ltd., and the electrolyte was ethylene carbonate/diethyl carbonate (EC/DEC) containing 1 mole $LiPF_6$.

Example 4

The prepared $(Li_{1.1}Mn_{1.9}O_4)_{1-x-y}(MgAl_2O_4)_x(Co_3O_4)_y$ (x=0.025, y=0.05) was uniformly mixed with the pulverized cobalt oxide (CoO) nanoparticles in a weight ratio of 90:10. Then, the battery was prepared by the same method as in Example 3.

Example 5

Synthetic graphite as a cathode active material and polyvinylidene fluoride as a binder were dispersed in a weight ratio of 90:10 in NMP (N-methylpyrrolidone) to prepare a slurry.

The slurry was coated to a thickness of 100 micrometers on an Al foil using a doctor blade, followed by evaporation of NMP at 120° C., pressing at a predetermined pressure, and cutting to a predetermined size, thereby preparing a cathode plate.

The cathode plate was cut to the same size as the anode plate, followed by a typical process for preparing a full cell. Then, with a separator interposed between the anode plate and the cathode plate, the resultant was subjected to heating and compression, and inserted into a coin cell provided as a battery case, followed by injecting a liquid electrolyte and sealing the coin cell, thereby providing a lithium ion battery. The separator was obtained from Celgard Co., Ltd., and the electrolyte was ethylene carbonate/diethyl carbonate (EC/DEC) containing 1 mole $LiPF_6$.

The anode plates prepared in Examples 3 and 4 were used to prepare full cells.

Comparative Example 1

Preparation of Anode Active Material for Rechargeable Lithium Batteries

As starting materials, lithium carbonate ($Li_2CO_3$) and manganese oxide ($MnO_2$) were prepared. The anode active material had a composition of ($Li_{1.1}Mn_{1.9}O_4$). The starting materials were placed in ethanol, followed by wet mixing and drying at about 110° C. for 24 hours. Then, the mixture was subjected to heat treatment under the same conditions as those of Example 1, thereby preparing a comparative material represented by $Li_{1.1}Mn_{1.9}O_4$.

Comparative Example 2

With this material, an anode plate and a half cell were prepared under the same conditions as those of Example 3, and a cathode plate was prepared under the same conditions as those of Example 5 to fabricate a lithium ion battery.

Experimental Example 1

XRD Measurement

X-ray diffraction patterns of the materials prepared in Examples 1 and 2 and Comparative Example 1 were measured using an X-ray diffraction spectrometer (Model No. Rint-2000, Rigaku, Japan) and results thereof are shown in FIG. 2.

Experimental Example 2

TEM Measurement

A TEM image of metal oxide nanoparticles of Example 2 obtained using TEM (Model No: H800, Hitachi, Japan) is shown in FIG. 5. It can be ascertained that the pulverized metal oxide nanoparticles have a particle size of 5 to 500 nm.

Experimental Example 3

Property Evaluation of Battery

For evaluation of properties of the lithium batteries prepared in Examples 3 to 5 and Comparative Example 2, charge/discharge testing was performed using a charge/discharge cycler (Model No. SM8, Hokuto Denko, Japan) at 60° C. in a voltage range of 3.3 to 4.3 V at a current density of 100 mA/g. The resultant charge/discharge curves are shown in FIGS. 2, 3 and 6, and discharge capacity and efficiency are shown in FIGS. 4, 7 and 8.

The examples according to the present invention exhibit superior discharge capacity and cycling characteristics to those of the comparative examples. In particular, as can be seen from FIGS. 7 and 8, when 10 wt % of metal oxide (CoO) nanoparticles was added, the capacity maintaining rate was significantly improved.

Experimental Example 4

TEM Measurement

The anode active material of Comparative Example 2 and the anode active material of Example 5 were observed using TEM after cycling 100 times at 60° C. For the anode active material of Comparative Example 2, the shape of the particles were significantly deteriorated due to HF generated by decomposition of the electrolyte salt, whereas the anode active material of Example 5 maintained particle shape thereof through significant decrease in the amount of HF scavenged by CoO as shown in FIG. 11.

Experimental Example 5

Measurement of Time-of Flight Secondary Ion Mass Spectroscopy

To confirm HF scavenging, $(Li_{1.1}Mn_{1.9}O_4)_{1-x-y}(MgAl_2O_4)_x(CoO)_y$, (x=0.025, y=0.05, 10 wt % of CoO nanoparticles) was analyzed using time-of flight secondary ion mass spectroscopy (ULVAC-PHI TFS2000, Perkin-Elmer Co., Ltd.) after cycling 100 times the anode active material of Comparative Example 2 and the anode active material of Example 5 at 60° C. The results are shown in FIG. 10.

As can be seen from FIG. 10, which shows the spectrum having a relatively strong secondary ion fragment of $CoF^+$ at a mass of 77.94, CoO nanoparticles scavenged HF.

It can be seen that eluted manganese oxidizes into MnO and reacts with HF, thereby generating $MnF_2$, as shown in FIG. 12. As a result, it can be ascertained that the powder represented by $(Li_{1.1}Mn_{1.9}O_4)_{1-x-y}(MgAl_2O_4)_x(CoO)_y$, (x=0.025, y=0.05, 10 wt % of CoO nanoparticles) effectively scavenges HF, thereby significantly reducing elution of Mn as shown in FIG. 12.

From this result, it can be concluded that it is possible to provide further improvement of the properties of the material using functionality of the nanopowders.

Although some exemplary embodiments have been described with reference to the accompanying drawings, it will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be in any way construed as limiting the present invention. The scope of the present invention should be limited only by the accompanying claims and equivalents thereof.

The invention claimed is:

1. An anode active material for rechargeable lithium batteries, comprising a spinel type anode active material $(Li_{1.1}Mn_{1.9}O_4)_{1-x-y}(MgAl_2O_4)_x(Co_3O_4)_y$ where $0.001 \leq x \leq 0.2$ and $0.001 \leq y \leq 0.2$), which is formed by substituting spinel type $(MgAl_2O_4)_x$ and spinel type $(Co_3O_4)_y$ into a basic spinel structure represented by $(Li_{1.1}Mn_{1.9}O_4)_{1-x-y}$.

2. The anode active material of claim 1, wherein the spinel type anode active material is mixed with metal oxide nanoparticles MO that range from 5 nm to 500 nm in diameter, where M represents one of Mg, Co, and Ni, and has a valence of 2.

3. The anode active material of claim 2, wherein the metal oxide nanoparticles MO act as scavengers of HF generated by decomposition of an electrolyte.

4. The anode active material of claim 2, wherein the metal oxide nanoparticles are mixed, in an amount of 0.01 to 10 wt % with the spinel type anode active material.

* * * * *